(12) United States Patent
Robilliard

(10) Patent No.: US 7,587,714 B2
(45) Date of Patent: Sep. 8, 2009

(54) SUPPORT TOOL FOR SOFTWARE PARAMETERIZATION

(75) Inventor: Pascal Robilliard, Issy les Moulineaux (FR)

(73) Assignee: Bull S.A., Les Clayes Sous-Bois (FR)

( * ) Notice: Subject to any disclaimer, the term of this patent is extended or adjusted under 35 U.S.C. 154(b) by 244 days.

(21) Appl. No.: 10/181,038

(22) PCT Filed: Nov. 9, 2001

(86) PCT No.: PCT/FR01/03499

§ 371 (c)(1),
(2), (4) Date: Jul. 12, 2002

(65) Prior Publication Data

US 2003/0023965 A1    Jan. 30, 2003

(30) Foreign Application Priority Data

Nov. 14, 2000    (FR) .................................. 00 14630

(51) Int. Cl.
*G06F 9/44* (2006.01)
*G06F 3/00* (2006.01)

(52) U.S. Cl. .................... 717/175; 717/121; 717/125; 715/764; 715/781; 714/15; 714/20

(58) Field of Classification Search ......... 717/168–178, 717/109, 110; 715/64–746; 709/202
See application file for complete search history.

(56) References Cited

U.S. PATENT DOCUMENTS

| | | | |
|---|---|---|---|
| 4,403,303 A | 9/1983 | Howes et al. | |
| 5,241,671 A * | 8/1993 | Reed et al. | 707/104.1 |
| 5,432,940 A * | 7/1995 | Potts et al. | 719/320 |
| 5,600,778 A | 2/1997 | Swanson et al. | |
| 5,798,752 A * | 8/1998 | Buxton et al. | 715/863 |
| 5,890,174 A * | 3/1999 | Khanna et al. | 715/504 |
| 6,066,182 A * | 5/2000 | Wilde et al. | 717/175 |
| 6,100,887 A * | 8/2000 | Bormann et al. | 715/764 |
| 6,237,135 B1 * | 5/2001 | Timbol | 717/107 |
| 6,262,730 B1 * | 7/2001 | Horvitz et al. | 715/707 |
| 6,275,225 B1 * | 8/2001 | Rangarajan et al. | 715/700 |
| 6,340,977 B1 * | 1/2002 | Lui et al. | 715/709 |
| 6,363,499 B1 * | 3/2002 | Delo et al. | 714/15 |
| 6,456,304 B1 * | 9/2002 | Angiulo et al. | 715/779 |
| 6,469,714 B2 * | 10/2002 | Buxton et al. | 715/762 |
| 6,518,989 B1 * | 2/2003 | Ishikawa | 715/848 |
| 6,519,767 B1 * | 2/2003 | Carter et al. | 717/140 |
| 6,587,122 B1 * | 7/2003 | King | 715/708 |
| 6,854,088 B2 * | 2/2005 | Massengale et al. | 715/764 |
| 6,880,086 B2 * | 4/2005 | Kidder et al. | 713/191 |
| 6,910,208 B1 * | 6/2005 | Zimniewicz | 717/174 |
| 2002/0016953 A1 * | 2/2002 | Sollich | 717/1 |

* cited by examiner

*Primary Examiner*—Tuan Q Dam
*Assistant Examiner*—Isaac T Tecklu
(74) *Attorney, Agent, or Firm*—Miles & Stockbridge P.C.

(57) ABSTRACT

The invention concerns the parameterization of a piece of software comprising parameters to be entered in order for the software to be used. The principle consists of subdividing the set of parameters into subsets, and of simultaneously displaying the subsets (SS1, SS2, SS3), the content of at least one selected subset, and the position within the set of each subset selected.

21 Claims, 3 Drawing Sheets

SUPPORT TOOL FOR SOFTWARE PARAMETERIZATION

TECHNICAL FIELD

The invention relates to a support tool for software parameterization. The invention applies to any software requiring parameterization prior to its execution. The invention applies, in particular, to the configuration of a user environment (shell, window manager, etc.), the creation of HTML (HyperText Markup Language) pages, the installation or configuration of software, etc.

The invention relates more particularly to the method for implementing such a tool, and to the graphical interface that implements this tool.

This tool can be implemented in a computing machine. Let us recall that a computing machine is a very large conceptual unit that includes both hardware and software, which can be the means involved in executing a given application, the means for executing a given function, a computer, as well as an information system in a cascaded systems architecture. A machine can therefore be a workstation, a server, a router, etc.

PRIOR ART

The exemplary embodiment chosen in the description below concerns the installation of a piece of software. This example naturally extends to the configuration of a user environment (shell, window manager, etc.), the creation of HTML (HyperText Markup Language) pages, the configuration of a piece of software, etc. Let us recall that the configuration of a piece of software takes place after installation, and consists of modifying all or some of the installation parameters.

Generally, a piece of software contains a certain number of parameters that a user must enter prior to its execution. There are tools to assist with the entry, most often called "wizards." This wizard is a program that automates a parameterization job by providing, and guiding the user by means of, a graphical interface.

The interface of the wizard is a window that generally comprises:

a title an area for data entry by a user, an area that includes three buttons (Previous, Next, Cancel/Finish), for moving from one window to another, or for canceling or finishing the installation.

During installation, the wizard presents a series of windows to be filled in successively. Each window includes parameters to be entered. The user must fill in the fields provided for this purpose, switching from one window to another by clicking on the "next" button.

A parameter to be entered could be, for example, the type of network used. After having entered the type of network, he need only click on the "next" button and a new window appears on the screen with new parameters to be entered, which could be the Internet Protocol (IP) addresses of servers, the address of a gateway in the network, etc.; and so on, with new windows including new parameters to be entered appearing successively on the screen until the installation of the software is complete.

This window also makes it possible, by clicking on the "previous" button, to modify the parameterization of a window. This particular case generally occurs when the parameters entered must be modified, or have been entered erroneously during the installation.

The big problem is that, from the moment the user begins an installation, wizards require that the latter be finished. For example, when the user fills in the windows successively, during the entry he may realize that there is a parameter he does not have. He is then forced to stop the installation procedure and postpone it until later. On resuming the installation, the user is forced to restart the parameterization of the software from the beginning. The time cost of such an installation can be substantial, especially when there is a high number of parameters.

Another big problem is that, during the parameterization of the software, the wizard does not indicate which step of the installation the user has reached. The user cannot see the progress of his installation, nor can he see how much time such an installation will take him.

Another problem is that wizards are designed for a sequential entry of the parameters. The wizard displays the various windows in a precise order. Sequential entry is sometimes inevitable when strict constraints make it necessary to fill in the various windows in a well defined order. But in certain cases, sequential entry is not appropriate.

SUMMARY OF THE INVENTION

A first object of the invention is to provide users with a support tool that makes it possible to suspend the installation procedure at any time without having to restart the parameterization from the beginning.

A second object set forth is to provide users with a wizard that makes it possible to display the progress of the entry of the parameters during the parameterization of a piece of software.

A third object set forth by the invention is to provide a graphical interface that is simple to use and intuitive.

To this end, the subject of the invention is a method for parameterizing a piece of software comprising parameters that must be entered in order for it to be used, characterized in that it consists of subdividing the set of parameters into subsets and of simultaneously displaying the subsets, the content of at least one selected subset, and the position within the set of each subset selected.

This results in a graphical interface that implements the method defined above, characterized in that it comprises a navigation area that includes subsets to select and the identifier of the subset selected, and an entry area that includes the content to be entered for the subset selected in the navigation area.

Another subject of the invention is the support tool for the parameterization of a piece of software comprising parameters that must be entered in order for it to be used, characterized in that it implements the method defined above, and in that it comes into contact with a user via a graphical interface as defined above.

One final subject of the invention is a computing machine comprising at least a processor and storage means, characterized in that it incorporates a support tool as defined above.

The example described below in reference to the attached drawings will illustrate the characteristics and advantages of the invention.

In the drawings.

In order to simplify the description, the same elements in the drawings have the same references.

DETAILED DESCRIPTION OF AN EXEMPLARY EMBODIMENT

Let us recall that the wizard according to the present invention can be implemented in any computing machine. In our exemplary embodiment, we have chosen to implement the wizard in a workstation.

Figure 1:
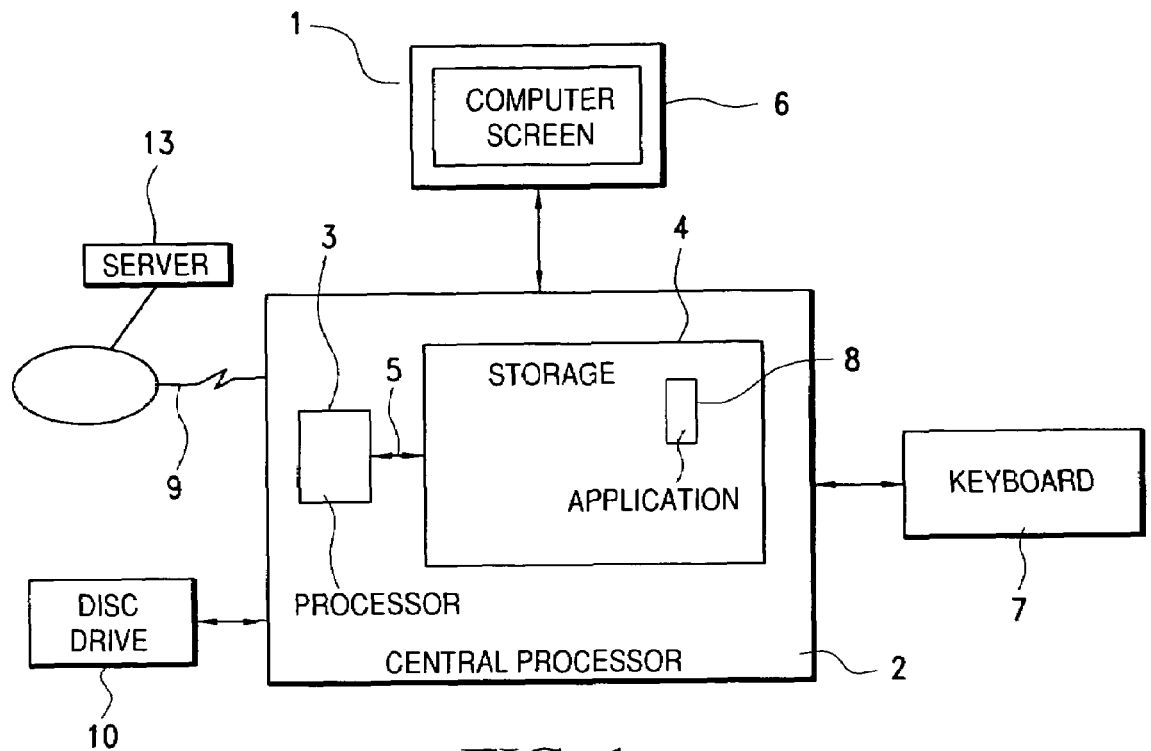
FIG. 1 represents a workstation in which the support tool according to the invention can be implemented.

FIG. 1 represents a workstation 1 comprising a central processor 2. The workstation 1 includes at least a processor 3 and storage means 4 interconnected with one another by means of a communication link 5.

The workstation also includes a computer screen 6 and a keyboard 7, both connected to the central processor 2 in a manner known to one skilled in the art.

An application 8 that includes a piece of software to be parameterized and its installation wizard are stored in the storage means 4 (e.g., a machine-readable medium). The application can be from any source. This application 8 can be downloaded via a network 9, or via a disk drive 10 such as a CD-ROM drive connected to the central processor UC, or through any other loading means known to one skilled in the art.

For purposes of illustrating the exemplary embodiment, let's assume that the network 9 is an internet type network and that a server 13, named DNS in the description below, is connected to this network.

In order for the application 8 to be used, it must be installed. The installation procedure consists of entering a series of parameters using the wizard, which guides the user during the parameterization.

The big problem is that the current wizards do not make it possible to display the progress of the entry and do not indicate which installation step the user has reached.

The solution consists of subdividing the set of parameters into subsets, and consists of displaying the subsets, the content of at least one selected subset, and the position within the set of each subset selected.

Figure 2:
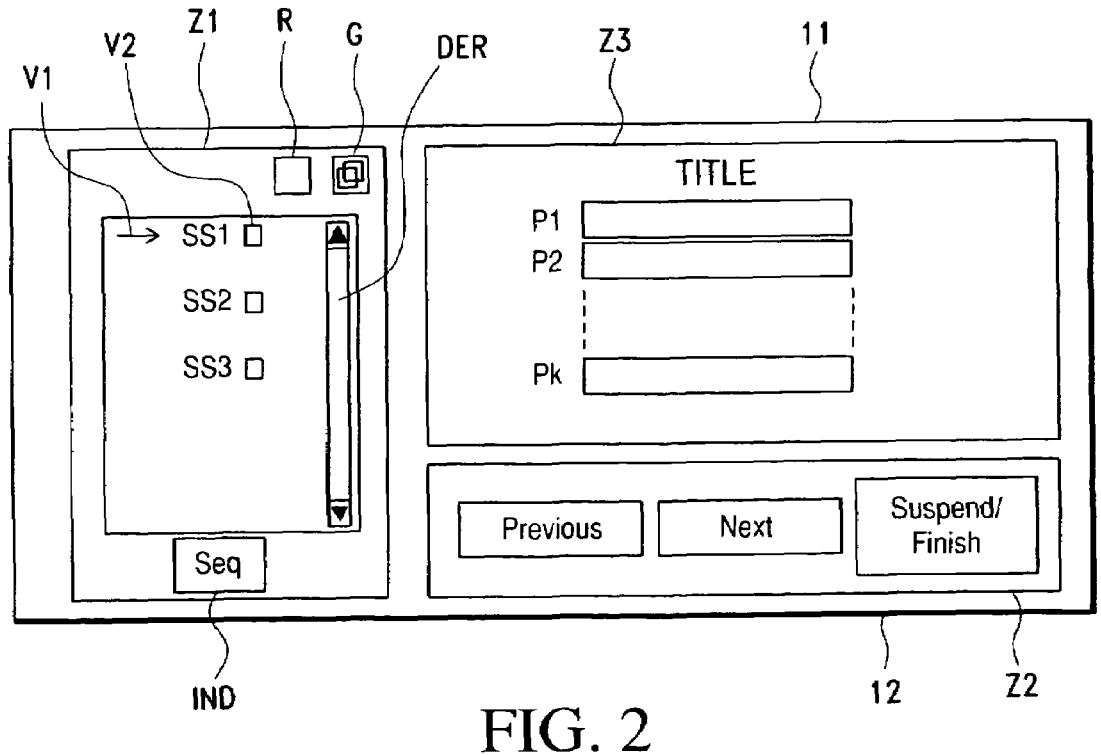
FIG. 2 is a partial schematic view of an exemplary graphical interface of a support tool according to the present invention; the interface is visible on a computer screen.

FIG. 2 is a view of the graphical interface 11 visible on the screen 6 represented in FIG. 1. This interface 11 comprises a window 12 that includes specific areas (Z1, Z2, Z3). The window comprises a first area Z1 that includes the subsets. This first area will be called the navigation bar in the description below.

a second area Z2 that includes, in particular, buttons for selecting a subset in the area Z1. This second area will be called the selection area in the description below.

and a third area Z3 that includes the parameters to be entered that correspond to the subset selected in the area Z2. This third area will be called the entry area in the description below.

Area 1

The navigation bar Z1 has the particular function of displaying the identifiers of the various subsets of parameters. In our exemplary embodiment, the subsets have respective names (SSn, with n=1, 2, 3). In the description below, the parameter n will be the rank of the subset in the set defined above.

This navigation bar includes a visual V1 that indicates the subset currently being entered. This visual is represented by an arrow. In FIG. 2, we see that the subset currently being entered is the subset whose identifier is SS2.

This tool bar also includes a visual V2 that indicates whether the subset has been entered or whether there are still parameters remaining to be entered. In our exemplary embodiment, a box that can be activated is located next to each name in the a set. In our example, a box associated with a subset is checked if all the parameters of this subset have been entered correctly; if not, this box is not checked.

Optionally, the bar includes an indicator IND that tells the user whether or not the selection of the subsets must be sequential. In the case of a sequential selection, the subsets must be completed in a very precise order.

Optionally, the navigation bar may be equipped with means CRG for reducing or enlarging the navigation bar so as to reduce or enlarge the entry area Z3. These means are commands R and G visible on the screen, which can be selected by means of a mouse. The command R, whose function is to reduce the navigation bar, is useful when the user wants, for example, the entry area Z3 to be more visible. The command G, whose function is to enlarge the navigation bar, is useful when there is a large number of subsets and the format of the bar is not enough to make all of the subsets visible.

Optionally, the navigation bar can be equipped with a scroll bar DER. This option is advantageous in the case where the number of subsets cannot be contained in the tool bar because the screen is not big enough.

In this navigation bar, the user can select a subset. The selection of a subset can be performed in various ways; the area Z2 described below constitutes an exemplary selection of a subset.

Area 2

The function of the area Z2 is the selection of a subset of the navigation bar. A functionality of this type can be implemented in various ways. The examples given below are not in any way limiting.

For example, the implementation of this selection function can depend on the entry mode for the subsets. The entry mode of the set may or may not be sequential.

The example illustrated in FIG. 2 is advantageous for an entry in the sequential mode. Since the sequential mode requires the subsets to be entered in a very precise order, the second area Z2 advantageously includes three buttons corresponding to options. These options can be selected using a cursor whose movement on the screen is controlled by means of a mouse. These options are as follows:

a first option called "next" is a command that makes it possible to switch from a subset of rank (n) to another subset of rank (n+1).

a second option called "previous" is a command that makes it possible to switch from a subset of rank (n) to another subset of rank (n−1).

a third option called "suspend/finish," which includes two commands:

The "suspend" command makes it possible to suspend the parameterization of the software and to save in the storage means MEM the subsets for which all or some of the parameters have been entered. This way, when the installation is resumed, the user retrieves the work performed before the suspension, thus avoiding having to restart the installation of the software from the beginning.

The "finish" command indicates that the user has finished entering the parameters of the set.

For the non-sequential mode, the buttons called "next" and "previous" are not used. The user can select a subset using his mouse. In this case, only the "suspend/finish" button is usable.

Naturally, the area Z2 as represented in FIG. 2 can be displayed no matter what the entry mode. The only difference is that:

for a non-sequential entry mode, the user can choose between using buttons in the area Z2 or the cursor controlled by the mouse.

for a sequential mode, the user preferably uses only the area Z2.

Area 3

A third area Z3 comprises fields corresponding to the parameters to be entered.

A subset of the navigation bar corresponds to a set of parameters (P1, P2, . . . , Pk) to be entered.

Preferably, this area includes a title corresponding to the identifier of the subset selected.

FIGS. 3 through 6 illustrate an exemplary illustration of the use of the areas Z1, Z2 and Z3 of the support tool according to the invention.

It is assumed that the entry of the parameters is sequential and that the subsets SS1 through SS3 must be entered sequentially in a precise order, i.e. SS1 followed by SS2 and SS3.

In this example, an area Z3 that includes the three buttons described above, i.e. "preceding," "next" and "suspend/finish," is advantageously chosen.

The example chosen consists of parameterizing a piece of software for which the parameters to be entered are:

the user's last name
the user's first name
his address
the IP address of his workstation
the name of his workstation
the name of the default gateway
the name of a server connected to the workstation (for example a name server DNS)
the name of this name server DNS
and the IP address of this server.

Step 1

A first step consists of creating the graphical interface. One can choose, for example, to divide a window into three areas Z1, Z2 and Z3.

This step consists of subdividing the set of parameters into subsets of parameters. Any number of subsets may be chosen. In our exemplary embodiment, we chose to subdivide the set into three subsets.

The first subset includes the following parameters:
the user's last name
the user's first name
his address
The second subset includes the following parameters:
the IP address of his workstation
the name of his workstation
the name of the default gateway
The third subset includes the following parameters:
the name of a server connected to the workstation (for example a name server DNS)
and the IP address of this server.

Each subset has its own identifier. The first subset has the name SS1, the second has the name SS2 and the third has the name SS3.

These three subsets are visible in the navigation bar Z1.

Step 2

A second step consists of running the software.

Step 3

Figure 3:
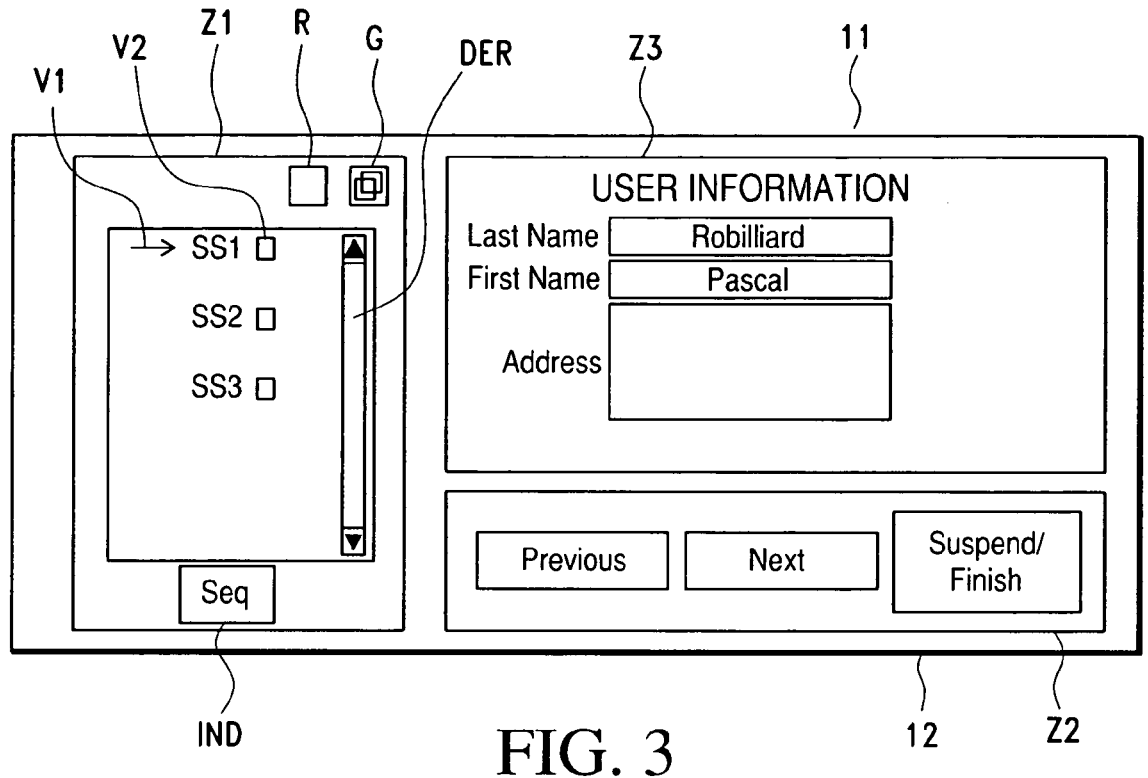
FIGS. 3 through 6 are views similar to the one in FIG. 2 and represent various steps in an exemplary method for parameterizing a piece of software according to the present invention.

FIG. 3 illustrates the graphical interface as it appears on the screen. The three areas Z1, Z2 and Z3 are visible on the screen. Preferably, the three areas appear on the screen simultaneously. In the area Z1, the various subsets (SS1, SS2 and SS3) appear on the screen. The entry mode being sequential, the wizard automatically positions the visual V1 represented by the arrow FLC on the first subset (SS1) of the sequence. The area Z3 displays on the screen the various parameters (the user's last name, the user's first name, and his address) associated with the subset SS1 selected in the navigation bar.

Step 4

Next, the user enters all or some of the parameters (Last name, First name, address).

In our exemplary embodiment, the last name is "ROBILLIARD"; his first name is "Pascal" and his address is "2 avenue Jean Jaures 75000 Paris"

At this stage, two cases may occur. A first case occurs if the user has entered all of the parameters of the area Z3 and wants to continue the parameterization. In this case, the user continues the entry procedure in step 5.

A second case occurs if the user partially enters the parameters and then wants to suspend the entry. For example, the user enters the last name and the first name and does not enter the address. In this case, the user can decide to suspend the installation procedure. He clicks on the "suspend/finish" button, which actuates the storage in the storage means of the parameters entered. Thus, when the user runs the software again, it presents him with the screen as it was when the installation procedure was suspended. The user can then enter the rest of the parameters, i.e., the address.

Figure 4:
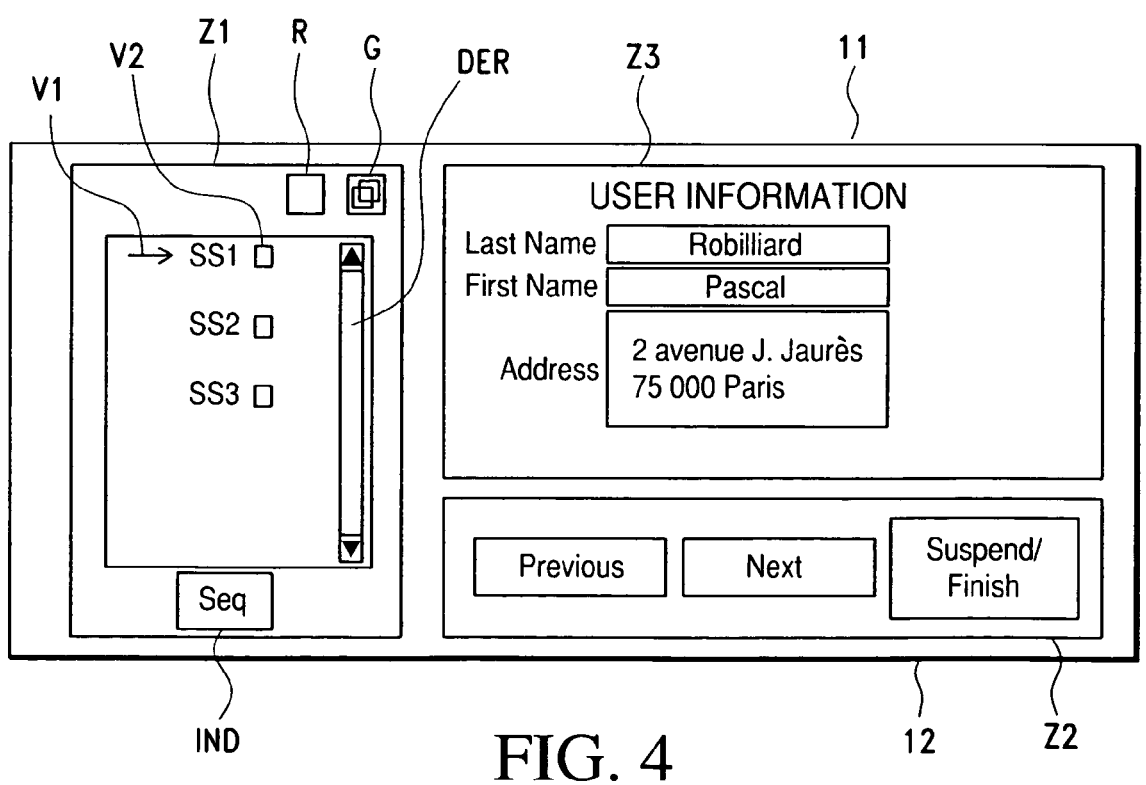

FIG. 4 illustrates a window in which all of the parameters corresponding to the subset SS1 have been entered. Automatically, the wizard checks the box located near the identifier SS1 in the navigation bar, indicating that the user has successfully entered the parameters of the subset SS1.

The parameters may happen to be entered with errors in the syntax. For example, during the creation of the window in step 1, it is possible to provide for the filling in of a field associated with a parameter to include syntactical constraints. For example, it is possible to make it so that a field can contain only characters. In such a case, the visual V2 is not activated if the user does not enter all of the parameters correctly. In such a situation, an adapted piece of software can warn the user by means of a message that includes, for example, the name of the parameter whose associated field has not been filled in correctly.

The warning message in question can be of any type. For example, the visual V2 can be replaced by a multi-colored light. This light would include, for example, three colors: green, orange and red, each having a specific meaning. For example, a red-colored light would mean that not all of the parameters have been entered. The orange color would mean that the parameters have all been entered but that at least one of the entries contains an error. Lastly, the color green would mean that all of the parameters have been entered successfully.

At this stage of the method, it is assumed that the user has entered all of the parameters corresponding to the subset SS1. In our exemplary embodiment, the visual V2 has been activated.

Step 5

Figure 5:
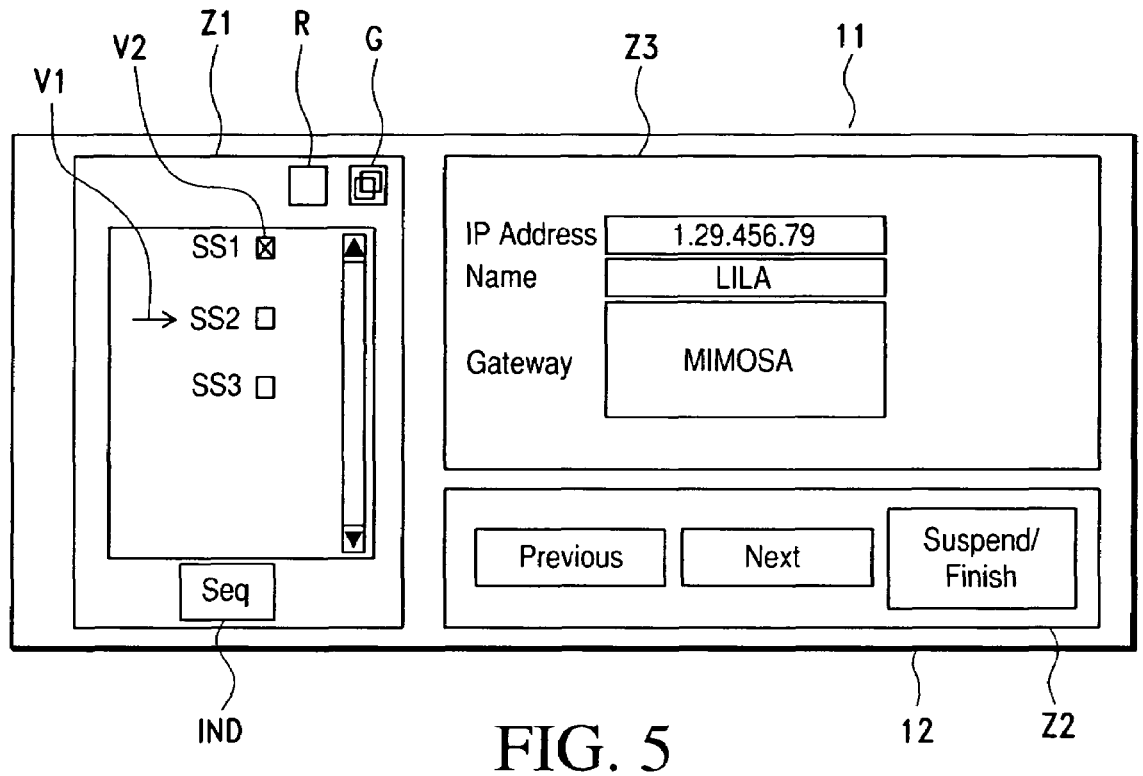

The next step (step 5) consists of clicking on the "next" button in the selection area Z3. Once the selection is made, a new window appears on the screen. This window is represented in FIG. 5.

The activation of the "next" command has the effect of moving the visual V1 next to the identifier SS2, indicating that the entry now concerns the subset SS2. The parameters associated with this subset appear on the screen, i.e. the IP address of the workstation, the name of the workstation, and the name of the default gateway.

Step 6

Next, the user enters the parameters. As explained above, the user can suspend the entry at any time by clicking on the "suspend/finish" button.

In our exemplary embodiment, the name of the station is LILA, its IP address is "1.29.456.79" and the name of the gateway to be defined by default is "MIMOSA".

Step 7

Figure 6:
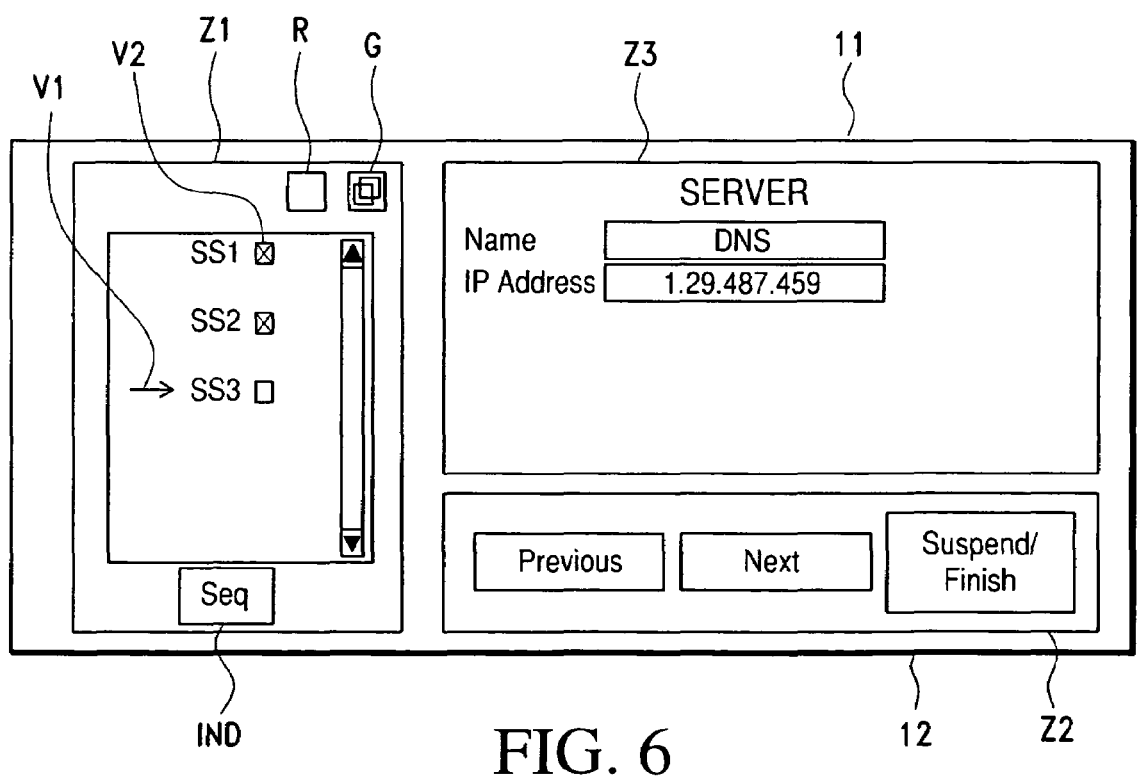

Once the parameters have been entered, the next step (step 7) consists of clicking on the "next" button in the selection area Z3. Once the selection is made, a new window appears on the screen. This window is represented in FIG. 6. As for step 5, the activation of the "next" command has the effect of moving the visual V1 next to the identifier SS3, indicating that the entry now concerns the subset SS3. The parameters associated with this subset appear on the screen, i.e. the name of the server connected to the workstation and its IP address.

Step 8

The user enters all of the parameters and clicks on the "finish" button in the area Z3.

In our exemplary embodiment, the name of the server is "DNS" and its IP address is "1.29.487.459".

Step 9 and End

The wizard automatically detects that all of the parameters have been entered and informs the user, at the end of the installation, that the installation of the software has been successfully completed.

Advantageously, at the end of the parameterization, the "suspend/finish" button is automatically replaced by a "finish" button. The user then need only click on the "finish" button to finish the installation.

During the parameterization steps (step 3 through step 8), the user can at any time click on the "previous" button in order to modify a parameter that he has entered in error.

Furthermore, it is possible for the area 3 to display several subsets. The user would have the ability to select several subsets in the navigation bar, and the position of these subsets in the navigation bar would be provided by means of respective visuals V2. It is clear that in our example, the choice to display only one subset is primarily linked to the size of the screen and to the number of parameters to be entered for a subset.

In general, the subject of the invention is a method for parameterizing a piece of software comprising parameters that must be entered in order for it to be used, characterized in that it consists of subdividing the set of parameters into subsets and of simultaneously displaying the subsets (SS1, SS2, SS3), the content of at least one selected subset, and the position within the set of each subset selected.

We have seen in our illustrated example that during installation, the user can suspend the entry of the parameters. To do this, the wizard stores in storage means (4) the partial entry performed so as to allow a subsequent resumption of the parameterization.

The progress of the entry is visible on the screen. The progress of the parameterization is monitored by visual means (V2) capable of informing a user whether or not the parameters of a subset have all been entered. Optionally, we have seen that it is possible to provide for syntactic constraints. This option makes it possible to indicate to the user whether he has entered the parameters correctly.

The navigation bar displays the position of the subset selected. In our example, visual means (V1) can indicate the position within the set of the subset selected. In our exemplary embodiment, the visual (V1) is an indicator positioned next to the identifier of the selected subset.

Advantageously, if a suspension has occurred, during the subsequent resumption of the parameterization, the visual means (V1, V2) will appear as they were upon suspension. The user resumes the parameterization in progress without restarting it from the beginning.

We have also seen that the entry mode can be sequential or non-sequential. For this reason, the wizard is provided with selection means in the selection area Z2. In our example, the selection of a subset is performed using selection means Z2 based on the sequential or non-sequential entry mode of the subsets. If the entry mode is non-sequential, the selection of a subset of the area (Z1) is performed by means of a cursor whose movement is controlled by a mouse or by means of "previous" and "next" commands visible on the screen. On the other hand, if the entry mode is sequential, the selection of a subset of the area (Z1) is performed by means of a cursor whose movement is controlled by a mouse.

We have also seen that the subsets each have a respective name (SSn). Preferably, these various subsets are distinguished by means of a unique identifier (SS1, SS2, SS3).

This results in a graphical interface that implements the method defined above. This interface comprises
- a navigation area (Z1) that includes subsets to select and the identifier (SS1, SS2, SS3) of the subset selected,
- and an entry area (Z3) that includes the content to be entered for the subset selected in the navigation area.

We have also seen that this interface additionally comprises a selection area Z2 that includes a command for suspending the parameterization procedure, and for storing, in storage means 4, the information entered prior to the suspension.

Another subject of the invention is the support tool for the parameterization of a piece of software comprising parameters that must be entered in order for it to be used, characterized in that it implements the method defined above, and in that it comes into contact with a user via a graphical interface as defined above.

One final subject of the invention is a computing machine comprising at least a processor and storage means, characterized in that it incorporates a support tool as defined above.

We can see that the present invention offers many advantages. It is clear that the support tool according to the present invention offers users great flexibility. The user can suspend the installation procedure at any time by clicking on the "suspend" command. When the user wants to resume the installation in progress, he is not required to restart the parameterization from the beginning.

Moreover, the presence of the visuals V1 and V2 in the navigation bar makes it possible to display and to easily monitor the progress of the installation.

We also see that the graphical interface is simple to use and intuitive.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

I claim:

1. A method for parameterization of software by a user in a computing machine, wherein the software requires a set of parameters to be entered in order for the software to be installed and used, comprising receiving a set of parameters and subdividing the set of parameters into subsets, simultaneously displaying the subsets, receiving a selection of at least one of the displayed subsets, and displaying the content of said at least one selected subset and its position within said set, thereby enabling parameterization of the software and informing the user of the progress of the parameterization of the software, wherein all of the subsets, the content of said at least one selected subset, the position of said at least one selected subset within said set, and the progress of parameterization are displayed concurrently such that the user may view the display throughout the duration of the parameterization, wherein the parameterization is adapted to be terminated during parameterization, prior to all parameter values in said set of parameters having been entered, with all parameter values that have been entered at a time of termination being stored in a storage means, and then restarted with all entered parameter values being restored and simultaneously displayed upon restarting to allow subsequent resumption and continuance of the parameterization, wherein said entered parameter values being restored and simultaneously displayed comprise a part of said set of parameters, wherein terminating the parameterization comprises closing said piece of software, and wherein said parameterization of the software comprises installing the software.

2. A method according to claim 1, further comprising suspending entry of the parameters during parameterization and storing any entry to allow subsequent resumption and continuance of the parameterization.

3. A method according to claim 1, wherein displaying the content of said at least one selected subset and its position within the set represents a display of the progress of the parameterization of the software and informs the user whether or not the parameters of at least one selected subset have all been entered.

4. A method according to claim 2, wherein displaying the content of said at least one selected subset and its position within the set represents a display of the progress of the parameterization of the software and informs the user whether or not the parameters of at least one selected subset have all been entered.

5. A method according to claim 1, wherein the selection by the user of a subset is performed based on a sequential or non-sequential entry mode of the subsets.

6. A method according to claim 2, wherein the selection by the user of a subset is performed based on a sequential or non-sequential entry mode of the subsets.

7. A method according to claim 3, wherein the selection by the user of a subset is performed based on a sequential or non-sequential entry mode of the subsets.

8. A method according to claim 4, wherein the selection by the user of a subset is performed based on a sequential or non-sequential entry mode of the subsets.

9. A method according to claim 6, wherein if the entry mode of the subsets is non-sequential, the selection of a subset displayed is performed by the user using a cursor whose movement is controlled by a mouse or by means of "previous" and "next" commands visible on a screen.

10. A method according to claim 6, wherein if the entry mode is sequential, the selection of a subset displayed is performed by the user using a cursor whose movement is controlled by a mouse.

11. A method according to claim 1, wherein displaying the subsets consists of distinguishing the subsets by means of respective unique identifiers.

12. A graphical interface embodied in a physical storage medium and visible on a screen for parameterization of software by a user, the software comprising a set of parameters that must be entered into a computer system in order for the software to be installed and used in a computing machine, comprising means for subdividing the set of parameters into subsets, means for simultaneously displaying the content of at least one selected subset and its position within the set, and means for displaying the progress of parameterization on the screen wherein all of the subsets, the content of said at least one selected subset, the position of said at least one selected subset within said set, and the progress of parameterization are displayed concurrently such that the user may view the display throughout the duration of the parameterization, wherein the parameterization is adapted to be terminated during parameterization, prior to all parameter values in said set of parameters having been entered, with all parameter values that have been entered at a time of termination being stored in a storage means, and then restarted with all entered parameter values being restored and simultaneously displayed upon restarting to allow subsequent resumption and continuance of the parameterization, wherein said entered parameters being restored and simultaneously displayed comprise a part of said set of parameters, wherein terminating the parameterization comprises closing said piece of software, and wherein said parameterization of the software comprises installing the software.

13. A graphical interface embodied in a physical storage medium and visible on a screen for parameterization of software by a user comprising a set of parameters that must be entered in order for the software to be installed and used in a computing machine, comprising
 a navigation area that includes the subsets that compose said set of parameters;
 means for selecting at least one subset;
 means for displaying in the navigation area the position of at least said selected subset within said set;
 an entry area that includes the content to be entered for at least the selected subset; and
 means for displaying the progress of parameterization of the software based on the content entered wherein all of the subsets, the content of said at least one selected subset, the position of said at least one selected subset within said set, and the progress of parameterization are displayed concurrently such that the user may view the display throughout the duration of the parameterization, wherein the parameterization is adapted to be terminated during parameterization, prior to all parameter values in said set of parameters having been entered, with all parameter values that have been entered at a time of termination being stored in a storage means, and then restarted with all entered parameter values being restored and simultaneously displayed upon restarting to allow subsequent resumption and continuance of the parameterization, wherein said entered parameters being restored and simultaneously displayed comprise a part of said set of parameters, wherein terminating the parameterization comprises closing said piece of software, and wherein said parameterization of the software comprises installing the software.

14. A graphical interface according to claim 13, wherein the selection means are comprised in a selection area of the screen.

15. A graphical interface according to claim 14, wherein the selection area includes a command for suspending the parameterization procedure, and for storing information entered prior to the suspension.

16. A graphical interface according to claim 13, wherein it includes an indicator (IND) indicating whether or not the selection of the subsets is sequential.

17. A graphical interface according to claim 14, wherein it includes an indicator (IND) indicating whether or not the selection of the subsets is sequential.

18. A graphical interface according to claim 15, wherein it includes an indicator (IND) indicating whether or not the selection of the subsets is sequential.

19. A support tool embodied in a physical storage medium, for parameterization of software by a user, wherein the software includes a set of parameters that renders the software in a computer machine workable, comprising means for subdividing the set of parameters into subsets and simultaneously displaying on a graphical interface the subdivided subsets, and a cursor for selection of a subset, a mouse for controlling movement of the cursor, which mouse is in turn adapted to be controlled by a user of the computer machine wherein all of the subsets, the content of said at least one selected subset, the position of said at least one selected subset within said set, and the progress of parameterization are displayed concurrently such that the user may view the display throughout the duration of the parameterization, wherein the parameterization is adapted to be terminated during parameterization, prior to all parameter values in said set of parameters having been entered, with all parameter values that have been entered at a time of termination stored in a storage means, and then restarted with all entered parameter values being restored and simultaneously displayed upon restarting to allow subsequent resumption and continuance of the parameterization, wherein said entered parameters being restored and simultaneously displayed comprise a part of said set of parameters, wherein terminating the parameterization comprises closing said piece of software, and wherein said parameterization of the software comprises installing the software.

20. A computing machine comprising a work station having at least a processor, a storage element, a communication element interconnecting the processor and the storage element, a graphical interface for displaying a set of parameters necessary for software stored in the storage element to be installed and used, and a support tool for parameterization of the software by a user, said tool being capable of subdividing the set of parameters into subsets and simultaneously displaying the subsets on the graphical interface, the content of at least one selected subset and the position within the set of each selected subset wherein all of the subsets, the content of said at least one selected subset, the position of said at least one selected subset within said set, and the progress of parameterization are displayed concurrently such that the user may view the display throughout the duration of the parameterization, wherein the parameterization is adapted to be terminated during parameterization, prior to all parameter values in said set of parameters having been entered, with all parameter values that have been entered at a time of termination being stored in a storage means, and then restarted with all entered parameter values being restored and simultaneously displayed upon restarting to allow subsequent resumption and continuance of the parameterization, wherein said entered parameters being restored and simultaneously displayed comprise a part of said set of parameters, wherein terminating the parameterization comprises closing said piece of software, and wherein said parameterization of the software comprises installing the software.

21. A machine-readable medium having stored thereon a plurality of executable instructions to perform a method comprising:
  receiving a set of parameters,
  subdividing the set of parameters into subsets,
  displaying the subsets simultaneously,
  receiving a selection of at least one of the displayed subsets, and
  displaying the content of said at least one selected subset and its position within said set, thereby enabling parameterization of software and informing the user of the progress of the parameterization of the software,
  wherein all of the subsets, the content of said at least one selected subset, the position of said at least one selected subset within said set, and the progress of parameterization are displayed concurrently such that the user may view the display throughout the duration of the parameterization,
  wherein the parameterization is adapted to be terminated during parameterization, prior to all parameter values in said set of parameters having been entered, with all parameter values that have been entered at a time of termination being stored in a storage means, and then restarted with all entered parameter values being restored and simultaneously displayed upon restarting to allow subsequent resumption and continuance of the parameterization,
  wherein said entered parameters being restored and simultaneously displayed comprise a part of said set of parameters, wherein terminating the parameterization comprises closing said piece of software, and wherein said parameterization of the software comprises installing the software.

* * * * *